US009940112B2

(12) United States Patent
Rajasekhar et al.

(10) Patent No.: US 9,940,112 B2
(45) Date of Patent: Apr. 10, 2018

(54) EFFICIENT FRAMEWORK FOR DEPLOYING MIDDLEWARE SERVICES

(71) Applicant: IGATE Global Solutions Ltd., Navi Mumbai (IN)

(72) Inventors: Preetha Rajasekhar, Navi Mumbai (IN); Surendra Yelavarthi, Navi Mumbai (IN); Soumitra Puthran, Navi Mumbai (IN); Rahul Murudkar, Navi Mumbai (IN)

(73) Assignee: CAPGEMINI TECHNOLOGY SERVICES INDIA LIMITED, Pune, Maharashtra (IN)

( * ) Notice: Subject to any disclaimer, the term of this patent is extended or adjusted under 35 U.S.C. 154(b) by 0 days.

(21) Appl. No.: 14/666,128

(22) Filed: Mar. 23, 2015

(65) Prior Publication Data
US 2016/0132309 A1 May 12, 2016

(30) Foreign Application Priority Data
Nov. 6, 2014 (IN) .......................... 3500/MUM/2014

(51) Int. Cl.
*G06F 9/44* (2006.01)
*G06F 9/445* (2018.01)
*H04L 29/08* (2006.01)

(52) U.S. Cl.
CPC .................. *G06F 8/60* (2013.01); *G06F 8/36* (2013.01); *H04L 67/16* (2013.01); *H04L 67/34* (2013.01)

(58) Field of Classification Search
CPC ... G06F 17/30; G06F 8/36; G06F 8/60; H04L 67/16; H04L 67/34
See application file for complete search history.

(56) References Cited

U.S. PATENT DOCUMENTS 6,256,676 B1 * 7/2001 Taylor .................... G06Q 10/06
709/246
6,640,249 B1 * 10/2003 Bowman-Amuah ..... G06F 8/36
709/228

(Continued)

FOREIGN PATENT DOCUMENTS

WO WO 2008/054740 A1 5/2008 ............... G06F 9/44

OTHER PUBLICATIONS

Dennis Smith, "Migration of Legacy Assets to Service-Oriented Architecture Environments", [Online], 2007, pp. 1-2, [Retrieved from Internet on Nov. 17, 2017], <http://delivery.acm.org/10.1145/1250000/1248991/28920174.pdf>.*

(Continued)

*Primary Examiner* — Ziaul A Chowdhury
(74) *Attorney, Agent, or Firm* — Sunstein Kann Murphy & Timbers LLP

(57) ABSTRACT

A system, method, and computer program product provide computerized services to multiple enterprises. A developer creates each service according to a template, which includes both core functionality common to all services, and individualized functionality specific to the service. The developer either deactivates, or activates and configures, each function in the core based on a service level agreement with the particular enterprise for which the service was created. The template provides a wide variety of core functions, including dynamic data transformation, auditing, logging, exception handling, performance monitoring, service availability, reporting, security, and dynamic reconfiguring. After the service is deployed, it begins to report performance and usage data to a monitoring system. Based on these data, the system calculates an amount to charge the enterprise for use of the given service.

12 Claims, 7 Drawing Sheets

(56) References Cited

U.S. PATENT DOCUMENTS

| | | | |
|---|---|---|---|
| 7,284,039 B2 | 10/2007 | Berkland et al. | 709/219 |
| 7,392,298 B2 | 6/2008 | Berkland et al. | 709/219 |
| 7,529,833 B2 | 5/2009 | Cai et al. | 709/225 |
| 7,593,994 B2 | 9/2009 | Milligan et al. | 709/206 |
| 7,676,786 B2 | 3/2010 | Shenfield et al. | 717/104 |
| 7,882,131 B2 | 2/2011 | Kim | 707/781 |
| 7,966,601 B2 | 6/2011 | Yamaizumi et al. | 717/114 |
| 8,195,566 B2 | 6/2012 | Tsui et al. | 705/40 |
| 8,214,514 B2 | 7/2012 | Gilfix et al. | 709/230 |
| 8,327,377 B2 | 12/2012 | Krishnamurthy et al. | 718/106 |
| 8,332,524 B2 | 12/2012 | Garfinkle et al. | 709/229 |
| 8,423,620 B2 | 4/2013 | Keum et al. | 709/206 |
| 8,479,175 B1 | 7/2013 | Heuler | 717/136 |
| 8,510,707 B1 | 8/2013 | Heuler | 717/106 |
| 8,521,838 B2* | 8/2013 | Bestfleisch | H04L 67/16 709/203 |
| 8,555,239 B1 | 10/2013 | Heuler | 717/100 |
| 8,640,149 B2 | 1/2014 | Liu et al. | 719/330 |
| 8,645,913 B2 | 2/2014 | Brunswig et al. | 717/106 |
| 8,700,737 B2 | 4/2014 | Ponnavaikko et al. | 709/218 |
| 8,756,320 B2 | 6/2014 | Butler | 709/226 |
| 8,793,660 B2 | 7/2014 | Belihomji et al. | 717/127 |
| 8,892,718 B2 | 11/2014 | Le et al. | 709/224 |
| 9,021,420 B2* | 4/2015 | Jacquin | G06Q 10/06 717/106 |
| 9,703,680 B1* | 7/2017 | Chang | G06F 8/60 |
| 2005/0086344 A1* | 4/2005 | Suesserman | H04L 67/34 709/227 |
| 2005/0144226 A1 | 6/2005 | Purewal | 709/203 |
| 2005/0160306 A1* | 7/2005 | Okunseinde | H04L 67/34 714/3 |
| 2005/0262192 A1* | 11/2005 | Mamou | G06Q 10/10 709/203 |
| 2005/0267892 A1* | 12/2005 | Patrick | H04L 67/16 |
| 2006/0020641 A1* | 1/2006 | Walsh | G06Q 10/10 |
| 2007/0150480 A1* | 6/2007 | Hwang | G06Q 10/00 |
| 2007/0294420 A1* | 12/2007 | Mohindra | G06F 8/60 709/230 |
| 2008/0065993 A1 | 3/2008 | Huang | 715/745 |
| 2008/0120592 A1 | 5/2008 | Tanguay et al. | 717/104 |
| 2008/0282231 A1 | 11/2008 | R et al. | 717/127 |
| 2008/0312898 A1* | 12/2008 | Cleary | H04L 41/0233 703/21 |
| 2009/0327406 A1* | 12/2009 | Miwa | H04L 67/16 709/203 |
| 2010/0218202 A1* | 8/2010 | Fikouras | G06F 8/36 719/331 |
| 2012/0054720 A1* | 3/2012 | Klein | G06F 9/44505 717/125 |
| 2012/0096434 A1* | 4/2012 | Rama | G06F 8/36 717/120 |
| 2013/0013734 A1 | 1/2013 | Garfinkle et al. | 709/217 |
| 2013/0232463 A1* | 9/2013 | Nagaraja | G06F 8/61 717/101 |
| 2013/0254755 A1* | 9/2013 | Yousouf | G06F 8/60 717/170 |
| 2013/0262626 A1* | 10/2013 | Bozek | H04L 67/10 709/217 |
| 2013/0282798 A1* | 10/2013 | McCarthy | H04L 41/0806 709/203 |
| 2014/0095601 A1* | 4/2014 | Abuelsaad | H04L 67/14 709/204 |
| 2015/0347934 A1* | 12/2015 | Ouyang | G06Q 10/0631 705/7.12 |
| 2016/0036628 A1* | 2/2016 | Gupta | H04L 41/08 455/420 |
| 2016/0105408 A1* | 4/2016 | Cooper | H04L 63/08 726/3 |

OTHER PUBLICATIONS

Pawel 'Swiatek et al., "Service Composition in Knowledge-based SOA Systems", [Online], 2012, pp. 165-188, [Retrieved from Internet on Nov. 17, 2017], <https://link.springer.com/content/pdf/10.1007%2Fs00354-012-0204-x.pdf>.*

Jing He et al., "A Smart Web Service Based on the Context of Things", [Online], 2012, pp. 1-24, [Retrieved from Internet on Nov. 17, 2017], <http://delivery.acm.org/10.1145/2080000/2078321/a13-he.pdf>.*

Longji Tang et al., "A Generic Model of Enterprise Service-Oriented Architecture", [Online], 2008, pp. 1-7, [Retrieved from Internet on Nov. 17, 2017], <http://ieeexplore.ieee.org/stamp/stamp.jsp?arnumber=4730454>.*

Wilcox, "Paying Too Much for Custom Application Implementation," Edgewater Blog, 3 pages (Mar. 11, 2011).

* cited by examiner

EFFICIENT FRAMEWORK FOR DEPLOYING MIDDLEWARE SERVICES

TECHNICAL FIELD

The present invention relates to service oriented architectures in software integration, and more particularly to providing a reusable service template to facilitate designing, implementing, and deploying middleware services.

BACKGROUND ART

Businesses are often large and complex, needing software that provides many different functions that change over time. Usually, a business will create or purchase application software on the basis of a functional need that exists at the moment. As needs change, and as technology also changes, businesses often grow a patchwork of different applications having different internal technology; for example, a billing application may be written in one programming language, the inventory program written in another, and the customer tracking application in a third. Various legacy applications may have different hardware requirements as well, or may be implemented using older technology for which transitioning to modern equivalents would be costly and time consuming. Also, these applications often were not designed to communicate with each other, requiring software developers to create custom "glue" software. There is therefore a need to perform "enterprise application integration."

To address these concerns, a relatively recent trend has been to build complex applications from software services that are small, easily extensible, modular components—this kind of software environment is called a "service oriented architecture", or SOA. For example, a call center application might be built from a billing history service, an order history service, and a telephone switchboard service, with a small central software routine that ties them together. If well designed, services can be used by multiple applications within an enterprise environment. Because services are small, they can be easily modified or upgraded to the latest technology, and because they are modular, service changes immediately propagate to all applications that use them.

To enable this functionality, services must be able to communicate with each other. In a service oriented architecture, an "enterprise service bus", or ESB, is a message formatting and delivery mechanism that performs this communication function. In the enterprise service bus, each service receives an input message requesting a particular function (e.g., retrieving a billing history according to certain parameters). The service then performs its function in a manner that is typically not visible to the other services, and generates one or more output messages with the results. An output message is sent to the requesting service or application, although any number of output messages may be generated (as an example, a second message may be sent to a security logging service). The enterprise service bus ensures that the meaning of each message generated by one service is compatible with the format required by other services. Older, legacy applications may be easily integrated with newer services by configuring the enterprise service bus to use their input and output channel data formats, without otherwise modifying the code of these applications that might have required expertise that is not readily available or inexpensive.

However, service development is largely a manual task. A normal build of a service has to go through a series of manual steps. Moreover, programmers may need to start from scratch. Even if a few reusable independent frameworks are available, they need to be integrated after manual creation of the baseline application flow. They need to do things like setting up the input and output message channels, configuring the application or environment properties files, and so on. The manual nature of this process, and the redundant work involved, introduces much inefficiency into the software development process and introduces many opportunities to make mistakes.

Automatic code generation software is known that can create application software automatically, but while this code generation process eliminates some of the repetitive nature of software development, it still requires programmers to manually create the "glue" that integrates various enterprise components together. In particular, existing solutions for integrating multiple applications lack automatic coupling of service input and output channels, the ability to record and replay past data in order to do regression testing, mock service availability when full back end applications are not available, plug and play features like service virtualization and service monitoring data collection, and controlled exception management, among others.

SUMMARY OF THE EMBODIMENTS

A system, method, and computer program product according to various embodiments of the invention provide computerized "Smart Services" to multiple enterprises. A developer creates each Smart Service according to a template, which includes both core functionality common to all services, and individualized functionality specific to the service. The developer either deactivates, or activates and configures, each function in the core based on a service level agreement with the particular enterprise for which the service was created. The template provides a wide variety of core functions, including dynamic data transformation, auditing, logging, exception handling, performance monitoring, service availability, reporting, security, and dynamic reconfiguring. This framework provides reliability, availability, and serviceability (RAS) guarantees to its users. After the Smart Service is deployed, it begins to report performance and usage data to a monitoring system. Based on these data, the system calculates an amount to charge the enterprise for use of the given service.

A first embodiment of the invention is a system for providing computerized services to a plurality of enterprises. The system is coupled to the plurality of enterprises using a first data communication network. It includes a data store, at least one server computer, a development system, and a monitoring system. The data store stores data used by the other components. The server computer is coupled to the data store using a second data communication network, and executes a plurality of computerized services as a function of the stored data.

The development system is coupled to the data store and the server computer using the second data communication network. It is configured to (a) create each service in the plurality of computerized services according to a service template, and (b) deploy each service in the plurality of computerized services for access by a given enterprise in the plurality of enterprises. Creating a given service according to the service template includes three steps. The first step is, in a manner specific to the given enterprise, either deactivating, or activating and configuring, each of a plurality of core functions in the given service, the plurality of core functions being present in each computerized service. The second step is configuring an individualized functionality that is specific to the given service. The third step is configuring the given service to communicate with either or both of (a) the given enterprise, using the first data communication network, and (b) at least one other computerized service in the plurality of computerized services.

The monitoring system is coupled to the data store and the server computer using the second data communication network. It is configured to (a) receive communications from each of the plurality of computerized services, after it has been deployed on the server computer, and (b) compute, for each given service, as a function of statistics data in the received communications from the given service, an amount to charge the given enterprise for use of the given service.

Various refinements of the system are contemplated. Thus, the core functions may include a combination of: message processing, service auditing, logging, exception management, service virtualization, mocking, stubbing, performance monitoring, service availability, service packaging, service configuration, event handling, data reporting, service discovery, service control, and service security. The first data communication network may include the Internet, and the second data communication network may include a local area network or a virtual private network (VPN). The development system may include a display upon which is displayed a graphical user interface having a wizard tool for configuring the plurality of core functions. And the statistics data may be one or more of: a number of times the given service has been accessed, a duration over which the given service was accessed, an amount of bandwidth consumed by the given service, an amount of computational time consumed by the given service, an average time taken to provide the given service, a number of exceptions raised by the given service, and an amount of data storage consumed by the service.

A second embodiment of the invention is a method of providing a plurality of computerized services to a plurality of enterprises. The method first includes, in a development system, creating a computerized service according to a service template, wherein the computerized service is configured to operate, as a function of data stored in a data store, in a server computer. Next, the method requires using the development system, in a manner specific to a given enterprise in the plurality of enterprises, to either deactivate, or activate and configure, each of a plurality of core functions in the given service, the plurality of core functions being present in each computerized service. Then, using the development system to configure an individualized functionality that is specific to the given service. After this, using the development system to configure the given service to communicate with either or both of (a) the given enterprise, and (b) at least one other computerized service in the plurality of computerized services. Next, using the development system to deploy the given service to the server computer for access by the given enterprise in the plurality of enterprises. A developer performs these steps multiple times.

After multiple services have been deployed, the method requires, in a monitoring system, coupled to the data store and the server computer, receiving communications from each of the plurality of deployed computerized services. Finally, the method calls for using the monitoring system to compute, for each given service, as a function of statistics data in the received communications from the given service, an amount to charge the given enterprise for use of the given service.

The variations on the system embodiment described above also apply to the method embodiment. Also, the method may be extended by a four step process. The first step is receiving a service request in a deployed service from a client application over a data communications network, such as the Internet or an intranet. The second step is retrieving data from the service request or from a data store over a private network, in response to receiving the service request. The third step is performing a computation on the retrieved data. The fourth step is transmitting the results of the computation to the client application over the data communications network. Performing the computation on the retrieved data may include transmitting a service request that includes a portion of the retrieved data to a second deployed service over the private network, and receiving a response from the second deployed service. Moreover, the results of the computation may comprise either a web page encoded using HTML, or a data structure encoded using either XML or JSON. Activating and configuring each of the core functions may include using a wizard tool displayed on a graphical user interface. The statistics data used to compute the amount to charge the given enterprise may comprise one or more of: a number of times the given service has been accessed, a duration over which the given service was accessed, an amount of bandwidth consumed by the service, an amount of computational time consumed by the service, and an amount of data storage consumed by the service.

A third embodiment of the invention is a non-transitory, tangible computer readable storage medium having computer code thereon for creating and deploying a computerized service to an enterprise. The medium has computer code for creating a computerized service according to a service template, wherein the computerized service is configured to operate, as a function of data stored in a data store, in a server computer. The medium also has computer code for, in a manner specific to the enterprise, either deactivating, or activating and configuring, each of a plurality of core functions in the given service, the plurality of core functions being present in each computerized service. The medium further has computer code for configuring an individualized functionality that is specific to the given service. The medium also has computer code for configuring the given service to communicate with either or both of (a) the given enterprise, and (b) at least one other computerized service in the plurality of computerized services. Finally, the medium has computer code for deploying the given service to the server computer for access by the enterprise. As with the system and method described above, the computer code may implement one or more of the following functions: message processing, service auditing, logging, exception management, service virtualization, mocking, stubbing, performance monitoring, service availability, service packaging, service configuration, event handling, data reporting, service discovery, service control, and service security.

A fourth embodiment of the invention is a method of improving efficiency of developing computer program code in a heterogeneous computing environment that has a service-oriented architecture. The environment includes a plurality of interoperating network services that cooperate to provide an application. The method first includes, in a code generation computer, providing template computer program code for a generic network service. The template computer program code defines (a) a configurable input data channel, (b) a configurable output data channel, and (c) a plurality of configurable pre-defined service components. The pre-defined service components each (i) receive input data from the input data channel or from another service component, (ii) operate on the input data to produce output data, and (iii) provide the output data to another service component or to the output data channel. Each pre-defined service component provides pre-defined default output data.

Next, in the code generation computer, the method calls for receiving a request to create a new network service, the request including configuration information for configuring (a) the input data channel, (b) the output data channel, and (c) a non-empty subset of the plurality of service components for inclusion in the new network service. Then, in the code generation computer, the method requires applying the received configuration information, to the template computer program code for the generic network service, to automatically generate a new specific network service that is configured to receive input data from the configured input data channel and provide output data to the configured output data channel according to operation of the configured non-empty subset of the plurality of service components. Once the new service has been generated, the method calls for deploying the generated computer code for the new network service in the heterogeneous computing environment for use by the plurality of interoperating network services. Finally, during use of the deployed computer code, the method requires developing computer code for an application-specific modification, to the generated computer code, for a business logic component in the new network service, the application-specific modification providing non-default output data.

Various modifications are contemplated. The pre-defined service components may include one or more of: a message cache, a message logger, a service virtualization component, a service monitor, a message format transformer, a stub component, a command component, and a service availability component. The method may further include dynamically reconfiguring one or more of the service components during use of the service by the heterogeneous computing environment. Alternately or in addition, the method may include transmitting performance and availability data, on a repeating basis by each network service in the heterogeneous computing environment, to a graphical dashboard. The performance data may include service usage data, in which case the method further comprises charging a customer on the basis of the service usage data. The customer may be charged on the basis of a service level agreement. Also, the method may include analyzing the performance and availability data and transmitting a warning to the graphical dashboard when errors detected in a plurality of services collectively indicate an error condition.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
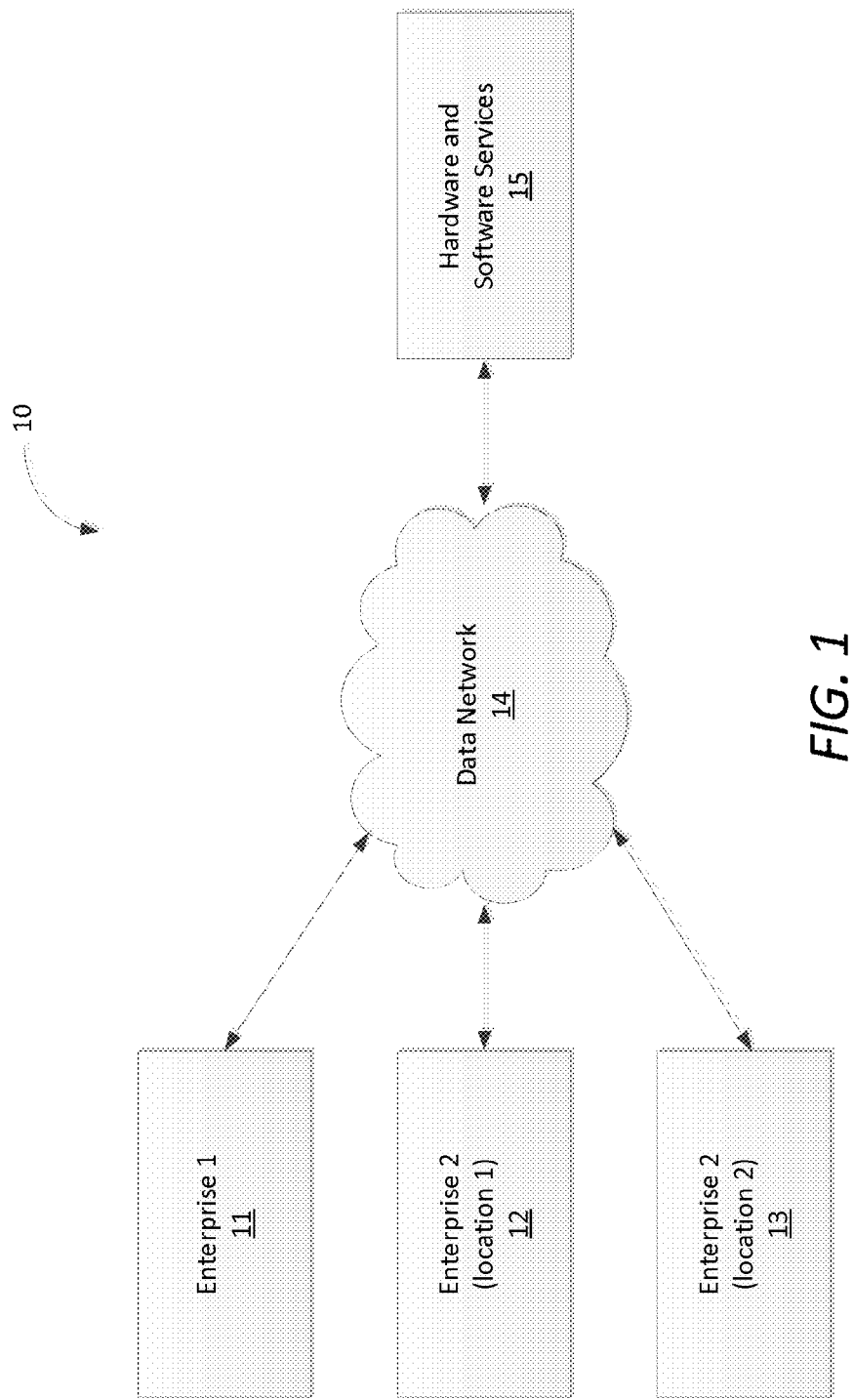
FIG. 1 is a schematic representation of an environment containing a service-oriented architecture (SOA) in accordance with an embodiment of the invention.

A system, method, and computer program product according to various embodiments of the invention provide computerized "Smart Services" to multiple enterprises. A developer creates each Smart Service according to a template, which includes both core functionality common to all services, and individualized functionality specific to the service. The developer either deactivates, or activates and configures, each function in the core based on a service level agreement with the particular enterprise for which the service was created. The template provides a wide variety of core functions, including dynamic data transformation, auditing, logging, exception handling, performance monitoring, service availability, reporting, security, and dynamic reconfiguring. This framework provides reliability, availability, and serviceability (RAS) guarantees to its users. After the Smart Service is deployed, it begins to report performance and usage data to a monitoring system. Based on these data, the system calculates an amount to charge the enterprise for use of the given service.

The Smart Services framework may be used by a middleware service provider to create multiple software applications for different customers, then charge those customers based on their usage of the provided middleware. Because Smart Services are reusable, the middleware vendor can offer customers rapid application development at a fraction of the cost of the customer hiring a team of programmers to implement such a system from scratch.

Using this framework, embodiments of the invention reduce the amount of custom work that needs to be performed by middleware developers to meet customer needs, thereby reducing inefficiencies in the software development process. Various improvements realized by embodiments of the invention include: pattern driven development that increases uniformity of the source code; consistent, standardized publication of performance metrics; publication of real-time, run time data that may be used for ESB performance monitoring and statistical data analysis; publication of processing statistics and data to permit the vendor to accurately charge customers based on usage; dynamic selection of and multiple input and output channels; embedded cache features and ability to refresh entire or sections of the cache via a service control command; publication of message traffic to an external service virtualization platform; availability of heart-beat messages to verify connectivity between Smart Services and all down-stream services; and an improved software deployment process in the production environment.

Definitions

As used in this description and the accompanying claims, the following terms shall have the meanings indicated, unless the context otherwise requires:

"RFC" is a numbered Request for Comments as published by the Internet Engineering Task Force and/or the Internet Society.

"MIME" means Multi-purpose Internet Mail Extensions, a standard identifier used by email software that indicates the format of email data (especially attachments). MIME is specified by the six RFCs 2045, 2046, 2047, 2049, 4288, and 4289, and any successor RFC(s). MIME types are registered with the Internet Assigned Numbers Authority ("IANA").

"SMTP" is the protocol used for exchanging emails that is based on RFC 5321 entitled "Simple Mail Transfer Protocol", or any of its predecessors or successors. SMTP (email) messages are formatted according to MIME.

A "media type" or "Internet media type" is a standard identifier, used by web applications that exchange data that indicates the format of the data. Media types also are registered with IANA, pursuant to RFC 6838 entitled "Media Type Specifications and Registration Procedures", and are the web analog of MIME types.

"W3C" is the World Wide Web Consortium, including its predecessors and successors.

"HTML" is any version of the Hypertext Markup Language recommended by the W3C as a web standard for the creation of web pages, and includes derivative markup languages used for the same purpose (such as XHTML). Where the context is clear, HTML also means a document created according to the relevant HTML web standard, which may have a media type "application/html", "text/html", or a derivative media type that includes "html".

"XML" is any version of the Extensible Markup Language, including any of its parts, recommended by the W3C as a web standard for encoding hierarchical data. When the context is clear, XML also means a particular set of hierarchy-defining constraints on the data encoding, as memorialized in a Document Type Definition ("DTD"), XML Schema Definition ("XSD") recommended by the W3C as a web standard for this purpose, or a similar arrangement. In the context of particularly defined constraints, XML also may mean a document created according to those constraints, which may have a media type "application/xml" or "text/xml", or a derivative media type including "+xml" as a suffix.

"JSON" is any version of the data serialization and messaging format, recommended by the W3C as a web standard for that purpose, that is based on RFC 4627 entitled "The application/json Media Type for JavaScript Object Notation". When the context is clear, JSON also means a document created according to the JSON format, which may have a media type "application/json", or a derivative media type including "+json" as a suffix.

"HTTP" is any version of the Hypertext Transfer Protocol, including any of its parts, recommended by the W3C as a web standard for exchanging data (including, but not limited to, HTML) between computers. "HTTPS" means HTTP Secure, a combination of HTTP with the Transport Layer Security ("TLS") or Secure Socket Layer ("SSL") security and encryption protocols, or any of their successors.

A "URI" is a Uniform Resource Identifier as defined in Internet Standard 66, also known as RFC 3986, entitled "Uniform Resource Identifier (URI): Generic Syntax", or any successor. A "URL" is a Uniform Resource Locator, a type of URI used to indicate the location of a resource without necessarily naming it. A "URN" is a Uniform Resource Name, a type of URI used to indicate the name of a resource without necessarily locating it.

"FTP" is the protocol for transferring files between computers that is based on RFC 959 entitled "File Transfer Protocol (FTP)", or any of its predecessors or successors. "FTPS" means FTP Secure, a combination of FTP with TLS or SSL, or any of their successors.

"SOAP" is any version of the protocol for exchanging structured information in a decentralized, distributed environment, including any of its parts, that is recommended by the W3C as a web standard for that purpose and is based on the Simple Object Access Protocol developed by Microsoft Corporation of Redmond, Wash. The media type for SOAP data is "application/soap+xml". Constraints on the structure of information exchanged using SOAP may be expressed using XML, and in particular using the Web Services Description Language ("WSDL").

"REST" is an acronym for "representational state transfer", and means a set of protocol design principles known in the art, based on HTTP, that constrain the exchange of data between computers in a distributed system. REST-compliant (or "RESTful") systems use a client-server architecture; are stateless (that is, each client transmits to each server all session state with each message); and have cacheable messages, among other properties. An example of a (mostly) RESTful system is the World Wide Web.

"IPC" is an initialism for "inter-process communication", a family of technologies, used to exchange information between threads of computational execution, that includes: files, process signals, sockets, message queues ("MQ"), anonymous and named pipes, semaphores, shared memory, message passing, and memory mapping.

"JAXM" is the Java API for XML Messaging defined by Java Community Process JSR 67, a JAVA® programming language interface that enables distributed software applications to communicate using XML and SOAP. "JMS" is the Java Message Service defined by the Java Community Process JSR 914, a JAVA® programming language interface that enables distributed software applications to communicate using message queues.

"SQL" is the Structured Query Language for managing data held in a relational database management system, as standardized by the International Organization for Standardization ("ISO") and the International Electrotechnical Commission ("IEC") as ISO/IEC 9075, any of its predecessors or successors, and any related standards.

An "enterprise" is an individual, business, corporation, organization, or other entity engaging or preparing to engage in one or more activities or business processes.

An "application" is a self-contained computer program that, when executed by a computer processor, assists in accomplishing one or more activities or business processes of an enterprise. A "web application" is an application that is accessed using the World Wide Web.

A "service" or "web service" is a discrete or indivisible unit of functionality within a given application that exchanges data with other applications and/or other services using SOAP, RESTful principles, or a functional equivalent. As used herein, a web service may, but need not, conform to the definition of web service, provided by the W3C Web Services Architecture Working Group, that requires the use of SOAP and/or WSDL.

A "service-oriented architecture" or "SOA" is a physical and logical system for providing services to one or more enterprises.

A "service consumer" is an enterprise that uses a web application or web service. A "vendor" or "service vendor" is an enterprise that provides web applications to a service consumer as an incidental business function. A "service provider" is an enterprise that provides web services to service vendors and/or service consumers. For example, a service consumer may purchase a product from a vendor, using an e-commerce web application leased or purchased by the vendor from a service provider.

FIG. 1 is a schematic representation of an environment 10 containing a service-oriented architecture (SOA) in accordance with an embodiment of the invention. The environment 10 includes a first enterprise having physical premises 11 and a second enterprise having two physical premises 12 and 13. While FIG. 1 shows only two enterprises, it should be appreciated that embodiments of the present invention may accommodate any number of enterprises. While FIG. 1 shows enterprises with only one or two premises, it should be appreciated that embodiments of the present invention may accommodate enterprises with any number of premises.

The enterprises are engaged in the performance of activities or business processes using one or more computers. For example, if an enterprise is a web retailer, front-facing business processes may include setting up a new customer account, providing web pages that show merchandise for sale, aggregating customer selections of goods into a virtual "shopping cart", prompting a customer for billing and shipping data, providing a web page that indicates shipping charges, and placing an order, among others. Likewise, back-office business processes may include customer database maintenance, monitoring the health of one or more web server applications, updating merchandise quantities, transmitting credit card information to a payment processor and validating the return authorization, printing tickets for warehouse runners to retrieve goods from shelves, transmitting shipping information to a delivery courier, preparing quarterly sales reports, and paying employees, among others. For Enterprise 1, these types of business processes occur at a single premises 11, while for Enterprise 2 these types of business processes are spread over multiple locations 12, 13.

The physical premises 11 are connected, via a data network 14, to hardware and software services 15. The data network 14 may be any kind of data communications facility, but one preferred embodiment includes a local area network ("LAN"), while another includes a virtual private network ("VPN") using encryption, layered over the Internet. Those of ordinary skill in the networking arts may envision other data networks that can be used in embodiments of the invention.

Hardware and software services 15 represent a computing facility that provides services to one or more enterprises, such as Enterprise 1 and Enterprise 2. In a preferred embodiment of the invention, the hardware and software services 15 are provided by a plurality of inter-networked server computers divided into functional groups that are explained in more detail in connection with FIG. 2. However, any computing facility may be used that provides the functions described herein.

The arrangement of the environment 10 permits a many-to-many relationship between enterprises and services. Thus, for example, a single enterprise may use multiple hardware and software services 15 to execute its necessary business processes. Conversely, a single hardware or software service, once operational, may be used by multiple enterprises subject to certain security measures described in connection with FIG. 2 that ensure legal compliance and prevent breaches of privacy.

Figure 2:
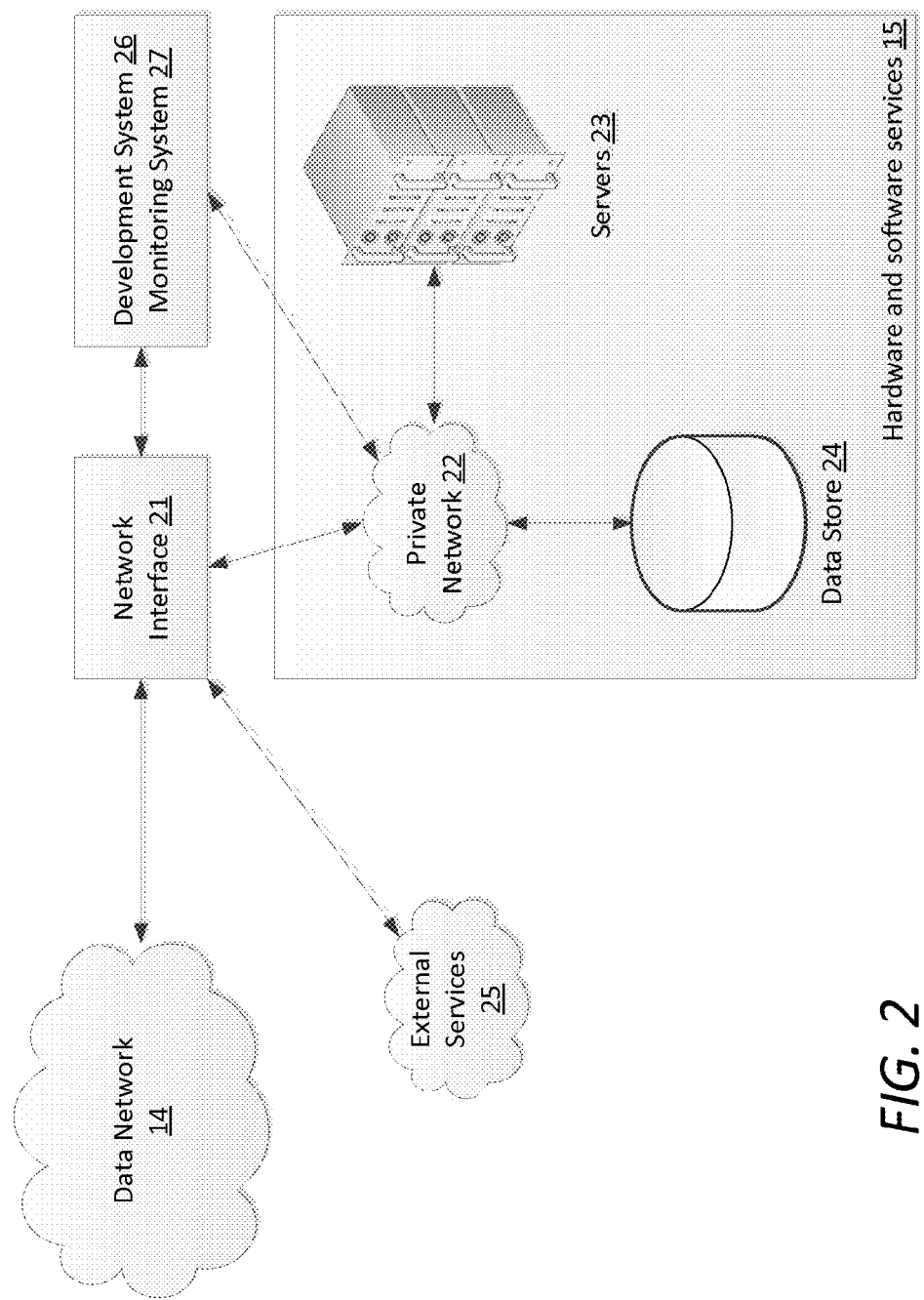
FIG. 2 is a schematic representation of physical components of the SOA of FIG. 1.

FIG. 2 is a schematic representation of physical components of the SOA of FIG. 1. Hardware and software services 15 are shown in greater detail. In particular, the services are provided by several physical components, including a network interface 21, a private network 22, servers 23, and a data store 24. Data network 14 and external services 25 are shown for reference.

The network interface 21 acts as a gateway to external data networks, including the data network 14, and other networks that provide external services 25. The network interface 21 may perform various security functions, including authentication of messages sent by various enterprises across the data network 14, firewalling functions, logging of data traffic, provisioning of messages coming from the data network 14 to different locations in the private network 22 or at different message rates, and so on, as known in the art. It also ensures that messages from the servers 23 meant for different enterprise premises are routed by the data network 14 toward their correct respective destinations. The network interface 21 may be implemented as a single computer having a network port (e.g., an Ethernet port); a single computer having a multitude of network ports; a dedicated, special-purpose computing device such as a router; a combination of these; or any similar mechanism known in the art.

The private network 22 is a data communication facility that is accessible only by computing devices under the control of the provider of the hardware and software services 15. The private network 22 permits these computing devices to communicate with each other. The private network 22 may be implemented as any wired or wireless network, for example as a LAN, as a backplane or backplane system that forms a computer bus, as a combination of hardware or software networks, or as any similar mechanism.

The servers 23 form the physical heart of the service-oriented architecture. The logical design of the SOA is described in connection with FIG. 3. The servers 23 provide a wide range of services that perform business functions. As the types of business functions are many and varied, the servers 23 may be accordingly grouped functionally. Thus, for example, the servers 23 may include, without limitation: email servers, web servers, XML processing servers, FTP servers, database servers, financial transaction processing servers, data caching servers, data logging servers, performance monitoring servers, auditing servers, reporting servers, message passing servers, SOA configuration servers, and system control servers. The servers 23 may be implemented using one or more computers, each having one or more computing processors.

The data store 24 is a repository for data used by the servers 23. It may be implemented as one or more computers having access to a memory, which may be volatile (e.g. random access memory, or "RAM") or non-volatile (e.g. disk or flash storage). The data store 24 may store a relational database or other such database used by one or more of the servers 23, and provide networked access to the database according to techniques known in the art. It should be appreciated that the each of the servers 23 may include local memory for storage, in addition to accessing data in the data store 24.

External services 25 include any services that cannot be, or are not, provided by the servers 23 but nevertheless may be accessed using a data connection. Examples of such external services may include, for example, arranging for a mailing provided by the United States Postal Service or a private courier, obtaining credit card authorization provided by a financial institution, paying vendors, purchasing goods or services, depositing payroll, and so on. External services 25 also may include legacy services provided by an enterprise that are not integrated into the SOA.

In a preferred embodiment, the network interface 21, private network 22, servers 23, and data store 24 are configured and monitored by a development system 26 and monitoring system 27. The systems 26 may be advantageously employed to both create and monitor Smart Services, as described in connection with FIG. 5. The development system may be implemented in a variety of manners, including one or more computers executing an integrated development environment as known in the art, and similar mechanisms. The monitoring system 27 may be implemented, for example, using a web application running as hardware and software services 15, or any other convenient means. The monitoring system 27 may trigger alerts or take other actions that require accessing the servers 23 or external services 25, independently of the operation of the servers 23, in a manner advantageous to the web service provider, the web service vendor, or the web service consumer. In particular, the monitoring system 27 may compute an amount to charge the web service vendor for use of each service or web application.

Figure 3:
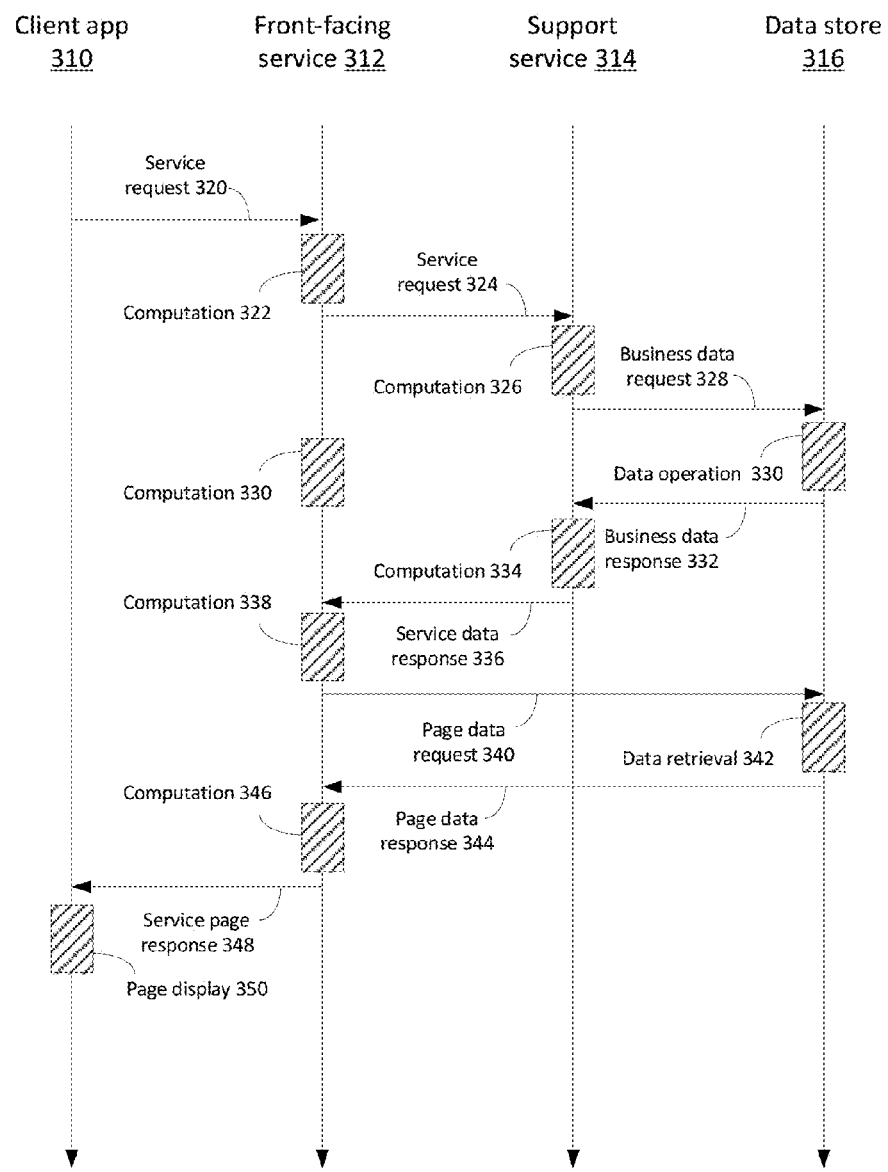
FIG. 3 is a flow diagram of a simple transaction using hardware and software services according to an embodiment of the invention.

FIG. 3 is a flow diagram of a simple transaction using hardware and software services 15 according to an embodiment of the invention. The transaction is initiated by a client application 310 to a front-facing service 312. The front-facing service 312 performs the transaction using a support service 314 and a logical data store 316. The client application 310 may be, for example, a web browser running on a computer in an enterprise. The front-facing service 312 and the support service 314 may be implemented using servers 23. The data store 316 may be implemented using data store 24.

The transaction of FIG. 3 itself, when viewed as a web service, may fulfill any relevant unit of business or organizational functionality. To illustrate this concept, one example of a web service is completing an order on a web retailing site by pressing a "Complete Order" button. In this simple example, the transaction is initiated when the client application 310 (in this case a web browser) receives the button press and transmits a request, to complete the order, to the front-facing service 312 (in this case, a program executing on a web server). The ultimate response is a web page or other response that is displayed by the client application 310—either a web page indicating that the transaction was successful, or a web page indicating that the transaction was not successful. The general web service operates in a similar manner to provide any discrete unit of functionality.

The general transaction begins when a client application 310 transmits a service request 320 to a front-facing service 312. In the general case, the client application 310 is any computer program that is configured to use a web service, although typically the client application 310 will be a web browser. The front-facing service 312 is accessible to the client application 310 (and, in general, to all client applications that have permission to access it) over a data communication network, such as data network 14. In general, the front-facing service 312 is accessible using any data exchange protocol, but preferred embodiments use either SOAP or a RESTful protocol. The service request 320 is formatted according to the particular protocol: XML for a SOAP request, or another format (such as JSON) for a RESTful request. It should be appreciated that other formatting protocols may be used. The client application 310 transmits the service request 320 to a particular URI, typically one found in the response to a previous service request or to a well-known URI (such as "http://www.google.com"). Thus, different services may be exposed to client applications by binding them to different URIs.

The front-facing service 312 provides a discrete unit of functionality that is individualized with respect to its URI. Thus, the front-facing service 312 has two general responsibilities: (1) to perform the requested functionality, and (2) to prepare a formatted response appropriate for the client application 310. Because the client application 310 is often a web browser, the front-facing service 312 is often a script or other executable program run by a web server. In the illustrated embodiment, the front-facing service 312 simply forwards the request to a support service 314 to execute the actual functionality, then retrieves and fills in an appropriate response page template. Other embodiments perform all business functionality in the front-facing service 312; persons skilled in the art will appreciate other variations on this concept.

Figure 4:
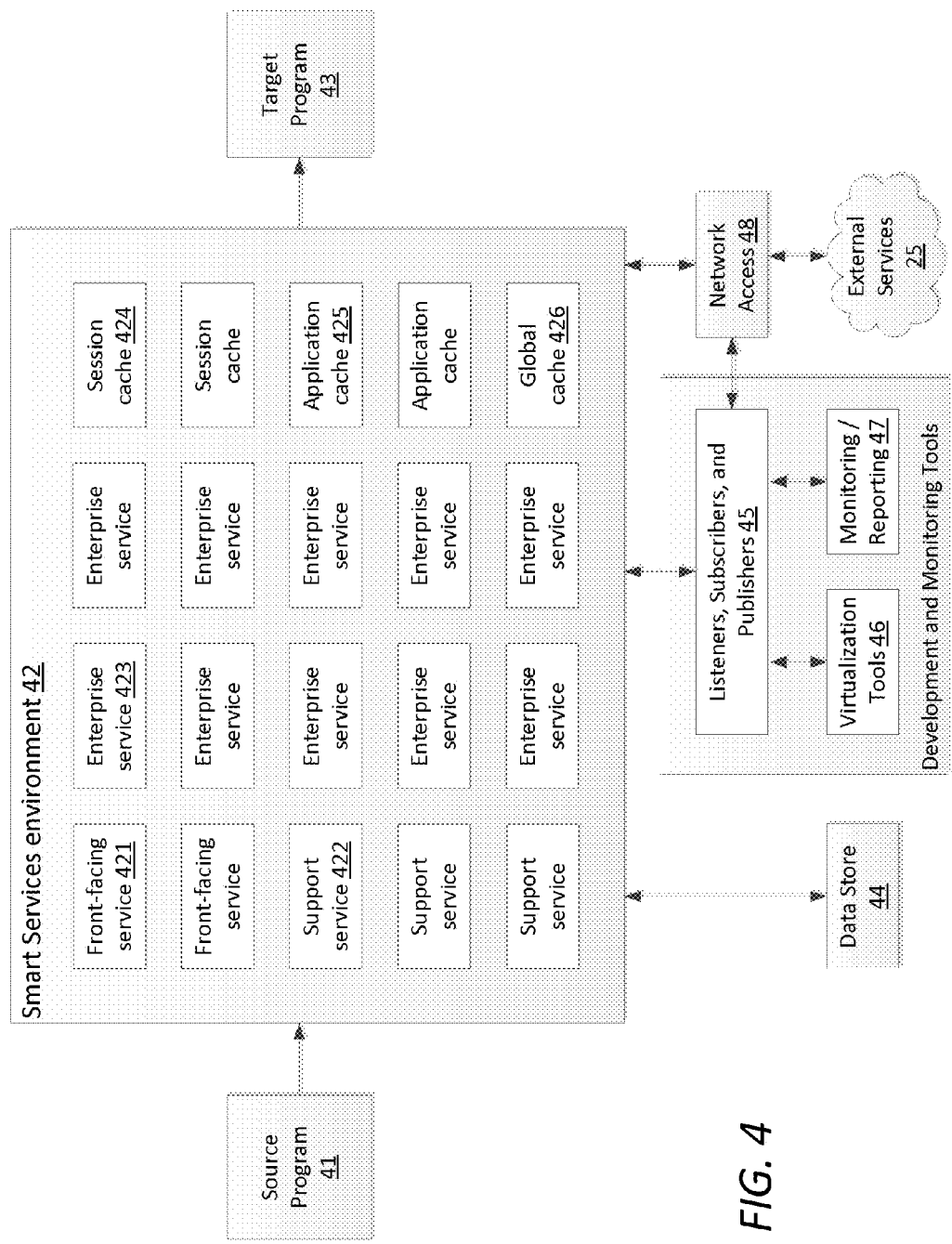
FIG. 4 is a schematic representation of logical components of an SOA in accordance with an embodiment of the invention.

Upon receiving the service request 320, the front-facing service 312 performs a computation 322 to determine how to service the request. In this case, the computation 322 determines which support service 314 should receive the request. As shown in FIG. 4 and discussed in more detail below, a preferred embodiment includes a large number of services to which such requests can be forwarded. Thus, the front-facing service 312 analyzes the data in the service request 320 to determine which support service 314 should be contacted.

When the computation 322 is complete, the front-facing service submits a service request 324 to the appropriate support service 314. In a preferred embodiment, this communication occurs over a private data network that is not accessible to the client application 310, such as the private network 22. Unlike the service request 320, the service request 324 may be formatted according to any suitable format, and need not use SOAP or REST protocols. Thus, for example, the service request 324 may be in the form of an inter-process communication, or other high-bandwidth, low-latency technique known in the art. The only limitations on the format of the service request 324 are defined by what the support service 314 is able to recognize and process. In accordance with an embodiment of the invention, a Smart Service (as discussed in connection with FIG. 5) may be configured, using very little manual effort, to accept data in a wide variety of formats. Thus, the use of a Smart Service advantageously reduces programmer error in developing new services.

Upon receiving the service request 324, the support service 314 implements the requested functionality. In accordance with an embodiment of the invention, the support service 314 is a Smart Service. Typically, the support service 314 performs a computation 326 that identifies which business data are required to implement the functionality. On the basis of this computation, the support service 314 transmits a business data request 328 to the data store 316 to request the relevant data. In a preferred embodiment of the invention, such a business data request 328 is implemented using ESQL, an XSL mapping tool, and the Java® programming language, .NET, or PHP, which provide operations to create, read, update, and delete data in a relational database management system.

Upon receiving the business data request 328, and as a function thereof, the data store 316 executes a data operation 330 on its stored data and returns a business data response 332. If the request 328 calls for the creation of new data, the data operation 330 creates the requested data, and the response 332 indicates that the data have been created. If the request 328 calls for a search of the existing data, the data operation 330 performs the search, and the response 332 includes the search results. If the request 328 calls for updating existing data, the data operation 330 updates the identified data in accordance with the request, and the response 332 indicates information regarding the update operation (e.g. how much data was updated). If the request 328 calls for deleting stored data, the data operation 330 deletes the data, and the response 332 indicates information regarding the deletion (e.g. how much data was deleted). If the data operation 330 fails for any reason, the response 332 indicates the mode of failure (e.g., the disk is full so a data creation request cannot be fulfilled).

Upon receiving the business data response 332, the support service 314 performs a computation 334 to finally implement the originally requested functionality. This computation 334, and the computation 326, are different for each different service 314 (and service 312). However, in accordance with a preferred embodiment of the invention, the remainder of the programming for each Smart Service advantageously includes identical core functionality that is flexibly configurable to meet a wide variety of application requirements. The ecosystem of Smart Services therefore provides a unified middleware framework that permits rapid prototyping, testing, and deployment of new services with a minimum of programmer error and implementation time. It should be appreciated that the support service 314 may contact other support services (not shown) or the data store 316 again during the course of performing the computation 334, if the computation is involved or requires complex or conditional data manipulation.

Upon completing the computation 334, the support service 314 transmits a service data response 336 to the front-facing service 312. The service data response 336 includes information pertaining to the implementation of the originally requested functionality, including any error conditions. The service data response 336 may be transmitted using the same protocol and formatting as the service request 324, or any other protocol or formatting.

Upon receiving the service data response 336, the front-facing service 312 fulfills its second obligation, namely to format the results according to a format that is useful to, or may be pleasing to display by, the client application 310. In this example FIG. 3, the front-facing service 312 determines a web page template as a function of the success or failure of the original request as reflected by the data in the service data response 336, then transmits a page data request 340 to the data store 316, to request the template. The data store 316 retrieves the web page template in a data retrieval operation 342, and returns the template to the front-facing service 312 in a page data response 344.

It should be appreciated that, instead of the process indicated in FIG. 3, a front-facing service 312 may instead retrieve the appropriate web page template from a caching mechanism (not shown). In a preferred embodiment, the front-facing service 312 consults such a caching mechanism, for example a local memory in one of the servers 23, prior to accessing the data store 316.

Upon receiving the page data response 344, the front-facing service 312 performs a computation 346 to combine the results of the service data response 336 with the web page template in the page data response 344. For example, the front-facing service 312 may substitute named result data into a similarly named placeholder within the web page template. It should be appreciated that other methods known in the art may be used to generate the final combination. Regardless what method is used, at the conclusion of the computation 346, the front-facing service 312 possesses a properly formatted service page response 348, which it then transmits to the client application 310.

Finally, upon receiving the service page response 348, the client application 310, processes the response in accordance with its own programming. Thus, for example, if the client application 310 is a web browser, it displays the response 350 within the browser display area on a computer monitor. Alternatively, if the client application 310 is a middleware application, it uses the service page response 348 as data to perform further computations.

This simple transaction illustrates many aspects of a typical use case, although it should be appreciated that this simple transaction is exemplary only, and that other service transactions may be less or (much) more complex. In particular, any service may access any other service or services any number of times, and services may access each other or the data store in any order. Thus, for example, the front-facing service 312 may access the data store 316 prior to accessing the support service 314.

Smart Services

In accordance with an embodiment of the invention, a service-oriented architecture provides an ecosystem of mutually cooperative web services, herein called Smart Services. This ecosystem is initiated and nurtured using the development system 26 and monitoring system 27. To ensure maximum interoperability between Smart Services, with a minimum amount of manual effort to develop them on the part of all stakeholders, Smart Services are based on a service template. This service template has two parts: a core functionality that is common to all Smart Services, and an individual functionality that is specific to each Smart Service.

FIG. 4 is a schematic representation of logical components of an SOA in accordance with an embodiment of the invention. For purposes of illustration, the SOA of FIG. 4 is described as executing two different web applications (for example, a web retailing site and a corporate information site), although it should be appreciated that an embodiment of the invention may execute any number of web applications.

Logically, in various embodiments an SOA receives a service request from a source software program 41, services the request using a Smart Services ecosystem 42, and delivers a response to a target software program 43. It should be appreciated that the source software program 41 and the target software program 43 may be the same programs within a single enterprise or business, or they might be different programs within a single enterprise, or they might be different programs within different enterprises. The Smart Services ecosystem 42 may be implemented, for example, using a software enterprise service bus or ESB, such as the IBM Integration Bus (formerly known as WebSphere Message Broker) from the International Business Machines Corporation of Armonk, N.Y.

The ecosystem 42 includes a number of different services and caches. As shown in FIG. 4, the ecosystem 42 includes front-facing services, such as service 421; support services, such as service 422; and business services, such as service 423. The ecosystem 42 also includes session caches, such as cache 424; application caches, such as cache 425; and a global cache 426. Each of these services and caches is now described in more detail.

Various services are present in the Smart Services ecosystem 42. A front-facing service 421 is any web service that is accessible by the source software program 41 using a URI. An example front-facing service 421 is the service 312 of FIG. 3. A support service 422 is a service that is used in maintaining the Smart Services ecosystem 42. For example, a support service 422 may be used to receive instrumented data from other services and forward that data to the listeners, subscribers, and publishers 45 described below. Or, a support service 422 may send heartbeat packets to the various servers 23 or logical services to ensure availability, and report status information and errors. An enterprise service 423 is a service that performs a discrete unit of enterprise functionality, such as completing an order or generating a sales spreadsheet. These types of services 421, 422, and 423 may communicate with each other using the ESB according to techniques known in the art to form a unified services ecosystem.

Various caches are also present in the Smart Services ecosystem 42. A session cache 424 may be used by various services to store information about an ongoing transaction between the source software program 41 and the target software program 43. For example, if one web application is an online ordering system, and an order takes several steps to complete (e.g., searching for an item, adding it to a "cart" or "basket", entering billing and shipping information, and approving the order), then various data associated with the order during the transaction may be stored in association with the buyer as a "session" in the session cache 424. Other uses for session caches should be appreciated by persons having ordinary skill in the art.

An application cache 425 is used by various services to store data pertinent to the web application generally, rather than individual users. Thus, the application cache 425 for an online ordering system may include web page templates for use by front-facing services 421, pricing information for popular items, and so on.

A global cache 426 may be used by all web services to access globally pertinent information. Such information may relate to the physical operating environment of the logical Smart Services ecosystem 42. The global cache 426 also may have information used by the services to communicate with each other, such as security and access rights tables, or service location information, accessed by program code in the system-wide Smart Service template described in connection with FIG. 5. In this manner, the global cache 426 acts as a mechanism that unifies all services in the ecosystem 42 as a coherent middleware framework.

Services in the Smart Services ecosystem 42 use a logical data store 44 to store persistent data; this logical data store 44 may be implemented a physical data store 24, or using other appropriate means. The logical data store 44 may be accessed by services 421, 422, and 423 as part of a caching algorithm that first checks the various caches 424, 425, and 426 for such data before accessing longer-term persistent storage.

The Smart Services ecosystem 42, and the development and monitoring tools described next, may access external services 25 by use of a logical network access 48, which may be implemented using the network interface 21 or other appropriate means.

Development and monitoring tools are used to develop and monitor the Smart Services ecosystem 42. In particular, various listeners, subscribers, and publishers 45 are used by the tools to communicate with the Smart Services ecosystem 42, and with external services 25. Virtualization tools 46 monitor these communications to develop data usage and traffic patterns that can be used to instrument virtual services, as described in connection with FIG. 5. Monitoring and reporting tools 47 also monitor these communications to detect various data and report them. Such data include, for example: operational conditions in the Smart Services ecosystem 42 or any of the individual services, including warnings and errors; status of a global, local, application, or session cache in the ecosystem 42, including cache throughput, and total and available capacity; availability of individual services as determined by a heartbeat or other mechanism; reporting of interesting data, such as service usage per enterprise, which may be used to bill individual enterprises for their use of each service; and security data, including attempted unauthorized access to various services in the ecosystem 42. These data may be reported in any variety of fashions, including by the creation of charts, emails, web pages, spreadsheets, reports, billing details, audit logs, or any other suitable mechanism.

Figure 5:
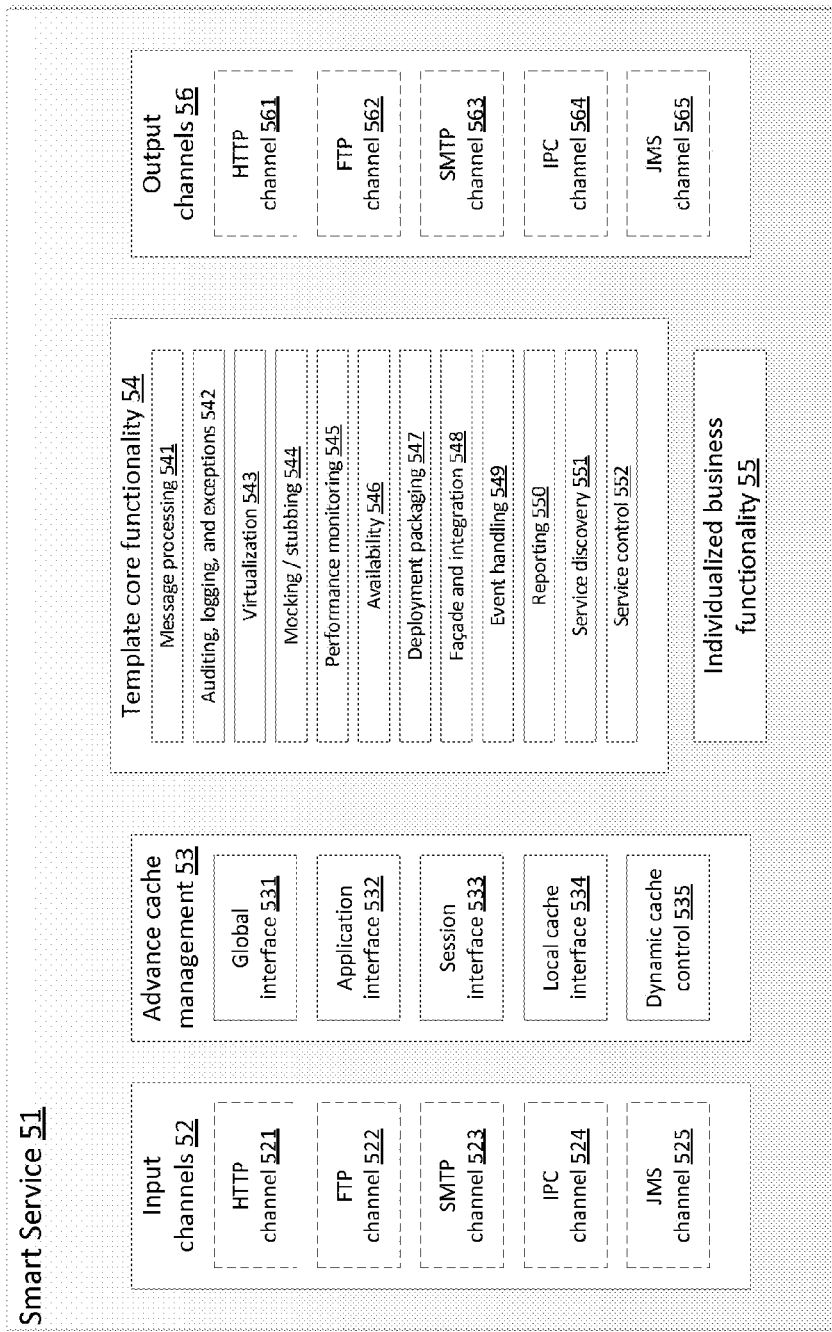
FIG. 5 provides additional detail about the functionality provided by the service template.

Each service 421, 422, and 423 in the ecosystem 42 is created using a Smart Service template. FIG. 5 provides additional detail about the functionality provided by Smart Services created from the template. Each Smart Service 51 has various input channels 52, cache management software 53, template core functionality 54, individualized business functionality 55, and output channels 56. Each of these is discussed in more detail below.

A Smart Service 51 may have multiple input channels 52 and multiple output channels 56. The Smart Service 51 illustrated in FIG. 5 has an HTTP input channel 521, an input FTP channel 522, an input SMTP channel 523, an IPC channel 524, and a JMS input channel 525. These input channels respectively receive HTTP (e.g. SOAP), FTP, SMTP, IPC, and JMS requests. Likewise, the Smart Service 51 has an HTTP output channel 561, an output FTP channel 562, an output MIME channel 563, an output IPC channel 564, and an output JMS channel 565. These output channels respectively send HTTP (e.g. SOAP), FTP, SMTP, IPC, and JMS responses. While the illustrated Smart Service 51 shows five input channels and five output channels, the number and type of actual input and output channels is advantageously configurable to use pre-developed adapter code. Other types of input or output channels include, for example: HTTPS, SFTP, file access using file descriptors, asynchronous channels such as a UDP/IP socket, publication and subscription channels such as RSS, and so on.

In prior tools, the input or output channels are static and the software developer needs to manually configure the routing logic between services and applications in order to send the messages to one or more output channels. But with the Smart Services framework, the input channels 52 and the output channels 56 can be configured to connect with known existing services or applications using a developer-friendly wizard. Conversely, a single Smart Service 51 can be exposed to existing services and applications in multiple ways, for example using a SOAP web service, file transfer protocol, or using message queues known in the art.

Each Smart Service 51 also includes advanced cache management 53. Each time a request comes to the Smart Service 51, it may need to use various application-related or environment-related information, such as which application is requesting the service and any context in which the request was made. Some parts of this configuration information can be stored in memory and used across multiple requests. These data are cached locally. The Smart Service template includes program code to interface a Smart Service 51 to the various caches shown in FIG. 4. Thus, the template includes code 531 to interface to the global cache 426, code 532 to interface to an application cache 425, and code 533 to interface to a session cache 424. As noted above, each service may have its own local cache as well, so the template includes code 534 to interface to this local cache. Finally, the cache management 53 includes dynamic cache control code 535 that permits a support service (such as service 422) to configure which cache data regions the Smart Service 51 accesses for corresponding data, and to reset cache performance statistics gathered by the cache management 53. In this way, the caching algorithm for the Smart Service 51 is advantageously run-time configurable or re-configurable, and is advantageously instrumented to provide performance feedback to the monitor.

Smart Services use various cache technologies to improve throughput. For all objects, whether loaded at startup or dynamically, any attached global cache elements are searched before going to the external source. If the item is found in the global cache, it is used and there isn't any need to retrieve it from the external source. However, if the data need to be retrieved from an external source, multiple channels may be used to improve performance.

Each Smart Service is customized to perform specific, individualized business functionality 55 as described in detail above. This task requires the efforts of computer programmers familiar with the Smart Service ecosystem 42 and the requirements of the functionality itself. Given the broad, general nature of the different types of business needs, it is not possible to go into much more detail about what sort of functionality may be required. However, the process by which a service becomes operational is improved by various embodiments of the present invention. In particular, computer programmers are fallible, and sometimes make mistakes. However, in accordance with embodiments of the present invention, each Smart Service 51 is equipped with a template core functionality 54 that permits new services to be designed, developed, tested, and deployed in a minimum of time and with a minimum of errors.

Template Core Functionality

The Smart Service template provides certain core functionality 54 to each Smart Service 51 in the Smart Services ecosystem 42. Because this core functionality 54 is available to each Smart Service 51, various embodiments of the invention realize a unified middleware platform whose service components are designed to be highly interoperable, and testable, deployable, and maintainable with a minimum of effort from a service provider. In particular, the core functionality of each Smart Service 51 may be configured by a service provider, using a "wizard" tool, to give precisely the level of functionality required by any given service vendor. In turn, this advantageously allows the service provider to charge the service vendor, during an initial design and implementation phase of any enterprise integration project, only for functionality actually required by the service vendor, thereby enabling a fine-grained billing system. Moreover, the fact that each core functionality provides a common level of instrumentation advantageously allows the service provider to charge the service vendor, during an operational phase of the enterprise integration project, only for functionality used by the service consumers, in exactly the amounts actually used, thereby enabling a fine-grained chargeback system.

The presence of identical subsystems in every Smart Service 51 permits tight coupling of services. Components that are shared between services include: service templates used for creating Smart Services; project templates for quickly preparing new files for applications that use Smart Services; audit trail and exception management components that can perform enterprise-wide data analysis, detect trends in usage and errors, and send alerts to the customer dashboard; and monitoring components and runtime dashboards that integrate with the auditing and exception management components of Smart Services. These components may be coupled in an enterprise integration application.

The Smart Services core functionality 54 includes message processing functions 541. These functions 541 include dynamic transformation of input messages for further processing by either the Smart Service 51 itself, by a downstream Smart Service, or by target program such as target program 43. Rules are stored in a number of transformation objects that may be configured using service discovery discussed below. The transformation object that is to be applied to an incoming message is determined by analyzing which input channel was used, various environment variables, fields within message headers, and message payloads.

In some embodiments, a transformation rules engine 541 may allow a selectable output source based on other rules, to format the output for the target program 43. This feature allows the same incoming message to be processed multiple times and delivered to different targets using different transformations. Also, it permits a single transformed message to be delivered to multiple targets. In this way, the dynamic transformation functions 541 permit type-agnostic message processing, dynamic selection and loading of transformation rules, and custom configuration of transformations.

The Smart Services core functionality 54 also includes auditing, logging, and exception handling functions 542. These functions 542 provide a standard auditing mechanism, and monitor the performance of the Smart Service 51 to raise exceptions in case any error condition occurs. Auditing provides instrumentation of the Smart Service 51 to collect real-time data. Logging then stores this information for later reporting to the service provider. Exception handling provides real-time notification to the service provider of any exceptions raised by the rest of the Smart Service code.

Auditing functions 542 instrument every service function that can generate performance data requiring collection. In some embodiments, these data include, for example: number of times the service was invoked, average size of received messages, number of times an error occurred (which may be broken down to any level, from overall invocation to individual programmatic functions), severity of each error, category of each error, and so on. Logging functions 542 take the instrumented data and store them. Log data may be categorized for easy searching according to its source, its severity, or its content. In particular, several logs may be stored, for example to facilitate ease of auditing of service availability, business function performance, and so on. Service logs may be stored locally in memory, and archived on a periodic basis. Exception handling functions 542 permit near real-time notification of service errors, and generation of alert warnings. In some embodiments, the alerts have a standard format, and are issued using any or several of the output channels 56.

The Smart Services core functionality 54 also includes service virtualization functions 543. These functions 543 provide sophisticated simulation of service functionality based on patterns of behavior previously observed to occur in similar, fully-functioning services. Service virtualization streamlines the quality assurance test process and removes road blocks to regression testing not provided by the service mocking and stubbing functions 544 described below. Service virtualization may be provided by various commercial tools, such as the IBM Rational Test Virtualization Server.

In some embodiments, a data mining function 543 performs data mining and network mining to determine complex patterns of behavior of the similar service, so that messages are emitted by the virtualized service in response to the correct conditions. In some embodiments, a reproduction function 543 creates reproduced or mimicked messages observed to have been emitted by the similar service. In some embodiments, a data generation function 543 customizes output responses, rather than merely mimicking observed messages. In some embodiments, the service virtualization functions 543 are dynamically configured at run-time using the service discovery functions 551 and service control functions 552 discussed below.

The Smart Services core functionality 54 also includes service mocking and stubbing functions 544. These functions provide rudimentary simulation of service functionality in the form of either a stub service that accepts service requests and returns "reasonable" service responses, or a mock service that additionally checks each service request according to various heuristics and raises exceptions if "unreasonable" input is detected. Service mocking or stubbing removes dependence upon problematic or non-existent services during regression testing.

In some embodiments, a stubbing function 544 creates a stub service without any custom code, according to basic configuration data provided by a software developer. The output is a completely functioning stub service that can be deployed into a run-time environment. This stub service has the ability of returning a proper reply to an input message, and can be configured to choose different, rule-based replies based on the value of a selection field found in the incoming message. Response templates may be provided for this purpose. If more realistic behavior is required, in other embodiments a mocking function 544 creates a mock service that also performs "sanity" checking of the input messages according to rules provided by the developer. The service control functions 552 described below instruct the Smart Service 51 whether to bind a URI to a virtualized service, a mocked service, or a stubbed service to facilitate access by other Smart Services and source programs.

The Smart Services core functionality 54 also includes performance monitoring functions 545. These functions 545 permit the service provider to ensure that the Smart Service 51 performs according to any requirements agreed to between the service provider and the service vendor. Thus, service monitoring permits the service provider to ensure adherence of the Smart Service 51 and its application to any contractual Service Level Agreement (SLA) or Key Performance Indicator (KPI) requirements.

Each Smart Service 51 collects its own throughput statistics. In various embodiments, such statistics include the number of messages processed over a given timespan, cumulative elapsed time, and average elapsed times for each message. In addition, the service monitoring functions 545 identify the number of messages that exceeded an SLA with the service vendor, the number of errors, and the state of the service by using published error and excessive SLA thresholds. All of this information may be published for consumption by other services at a configurable frequency. If an SLA threshold is exceeded, a correction function 545 is invoked to take an appropriate corrective action, such as throttling incoming messages or warning the service provider. Each Smart Service 51 automatically publishes per-message performance data upon completion of processing. This information may be consumed by the monitoring system 27, and used to generate various performance reports.

In some embodiments, a Smart Service 51 includes prepackaged reports built using various data mining tools. These reports are built into various graphical framework dashboards available when a customer logs into a special website that shows these tools. Charge-back artifacts also may be built into the dashboards. These artifacts can be daily, monthly or quarterly, and have detailed information that can be used by the service provider to bill individual services usage to the customer. Some of the collected data is message traffic, size, and usage during peak-time. These artifacts can be viewed on-line, or delivered via email to customers. Reports can be dynamically driven (ad hoc), or statically driven such as a report that shows the status of all active Smart Services. These reports operate in a near real-time manner. Any ad hoc report can be converted into a PDF or spreadsheet and emailed to recipients directly from these tools. All information is collected and combined to give a complete picture of the state of the Smart Services that are active in the entire enterprise.

The Smart Services core functionality 54 also includes service availability functions 546. These functions 546 provide a mechanism, for services implementing business-critical (and sometimes non-critical) applications, by which other services can determine the operational status of the given Smart Service 51. In some embodiments, a service availability function 546 responds to a "heartbeat" or "ping" request by returning a small reply. This function allows another service to determine that the given Smart Service 51 is available merely from the fact that the other service received the reply. In some embodiments, another service availability function 546 responds to a service request by returning information about the operation of the service, such as how long the service has been active. In some embodiments, another service availability function 546 actively monitors the Smart Services environment and sends alerts to a support service when it appears, based on pre-determined rules, that service availability will be compromised.

Using the service availability functions 546, a vendor can learn the status of the service (i.e., whether it is running or not). In the prior art, such availability tools were developed for each service, and redeployment was costly and piecemeal. However, in accordance with various embodiments of the present invention, service availability functions 546 may be deployed once for all services. Moreover, heartbeat requests to determine service status may be loaded into the local cache using interface 534, so the execution of the service availability 546 will be very fast.

The Smart Services core functionality 54 also includes deployment packaging functions 547. These functions 547 permit the Smart Service 51 to configure itself to its operating environment, whether it is deployed for testing or for in-service operation. One packaging function 547 may include deployment instructions that indicate to the Smart Services ecosystem 42 how to deploy and configure files contained in a deployment package, such as a JAVA® web archive (.war) file or an enterprise archive (.ear) file. Another packaging function 547 may indicate to the ecosystem 42 how to rollback this Smart Service 51 so that it is no longer deployed—this rollback function reverses the deployment function. Another packaging function 547 may indicate to the ecosystem 42 a version of the Smart Service 51. Another packaging function 547 may indicate what other Smart Services, and their versions, are required for the given Smart Service 51 to function properly. Additional packaging functions 547 may indicate other dependencies, such as a version or configuration of the ecosystem 42 itself, or other custom dependencies, including application- or vendor-specific external programs that must be available.

Smart Services can be packaged into the deployable components along with business specific applications using the packaging component. The packaging can be done in several ways using an integration technology-specific packager. After running the Smart Service 51, a service call can provide various configuration properties.

The Smart Services core functionality 54 also includes integration functions 548. These functions 548 permit initialization and configuration of the various Smart Service features. In particular, integration functions permit the Smart Service 51 to customize the operation of its input channels 52, advanced cache management 53, and output channels 56, and initialize and configure the other core functionalities, such as logging functions 542. One integration function 548 provides a façade, or interface, by which other Smart Services can access it, thereby hiding its own implementation details, while providing a mechanism to correlate service requests to various internal functions. Another integration function 548 manages the identity of the Smart Service 51. Identity management allows this Smart Service 51 to determine whether to allow access by other Smart Services, and vice versa. Because every Smart Service 51 includes this function, the operating ecosystem 42 can be secured by the service provider to advantageously permit service reuse between service vendors while preventing cross-vendor data access, if the service provider desires. Each Smart Service 51 also can be integrated with external tools to provide repository maintenance (e.g., using the IBM WebSphere Service Registry and Repository, or WSRR), reporting tools (e.g., using various big-data tools from Splunk Inc. of San Francisco, Calif.), and virtualization tools as described above.

The Smart Services core functionality 54 also includes event handling functions 549. These functions 549 provide a mechanism for the Smart Service 51 to generate events for other Smart Services, subscribe to events generated by other Smart Services, and to process events. A Smart Service 51 can generate events when various rule-based conditions are met. Such conditions may be business rules, for example. In some embodiments, the rules themselves are stored in an event rule repository. When an event is generated, an event handling function 549 may notify another Smart Service or the service provider. Also, another event handling function 549 may subscribe the Smart Service 51 to events generated by other Smart Services, or by the service vendor. As an example of the latter functionality, the service vendor may wish to instruct an online shopping service to being accepting orders for a new product only upon receiving the vendor's signal. Another event handling function 549 may monitor events generated internally and received from other sources, and report on these events to the monitoring system 27.

The Smart Services core functionality 54 also includes performance and usage reporting functions 550. These functions 550 permit monitoring and reporting of business functions. One reporting function 550 maps raw usage data into useful business data. These usage data include run-time metrics and real-time metrics. Another reporting function 550 may produce a chart or dashboard that compiles various business data useful to the service vendor, such as how many times or for how long a given service has been accessed, or how much bandwidth, computational time, or data storage the service has consumed. These statistics are published to the monitoring system 27 to provide a measure by which the service provider can charge the service vendor for service usage. Computation of the charge may be a function of any such statistics or business data. Another reporting function 550 may permit the service provider or vendor to perform ad-hoc queries against the raw data or "cooked" business data. Yet another reporting function 550 may permit the service provider or vendor to create custom reports, including hierarchical reports having drill-downs.

The Smart Services core functionality 54 also includes service discovery functions 551. These functions 551 provide the Smart Service 51 with data, such as XML or XSL, required to configure itself. Configurable service properties include environment-related information such as authentication (e.g. password) information required to access the service. Discovery functions 551 include a dynamic service that can receive and update these properties while it is running.

In some embodiments, the Smart Services environment includes a service registry that permits the Smart Service 51 to search for other Smart Services based on their names or capabilities. The service registry may be leveraged to permit the Smart Service 51 to dynamically discover other services that fulfill business functionalities required by the individual service 51. To the extent that these functionalities are sufficiently described, the registry permits the coding of other core functionality 54 or the individualized business functionality 55 to be specified in high-level terms of what must be performed, rather than how it is performed, based on various pre-determined rules. In some embodiments, registry information itself may be dynamically loaded at run-time, rather than hard-coded into the service template. In all cases, the global cache 426 connected to the ESB will be searched for a request object, and if found, the global cache 426 will be used to connect the application to the service. In this way, the relatively less efficient processes of accessing the data store 44 and service lookup registry tools can be avoided.

In some embodiments, the discovery functions 551 also include functions to manage the lifecycle of access to business functions or support functions. Application configuration data can be provided in properties files, for example in the data store 44. The Smart Services ecosystem 42 pulls this information into the application cache 425 of any application that needs it. Each time there is a change to the application configuration, for example when a new feature has been added, the change data are stored to the properties files and reloaded into the cache 425 for use by each Smart Service 51 that needs it. These files can be loaded using service repository tools known in the art when the service first loads, or by the service control functions 552 at run-time.

As one example of application configuration data, a service vendor may decide to purchase an upgrade from a "standard" version of an application to a "premium" version. In this case, the application configuration data is edited by the service provider to reflect this purchase, and the new configuration is uploaded to the Smart Services ecosystem 42. Then, each service in the application is instructed, using the service control functions 552, to enable the new features on demand. The entire process can take only a few minutes, after which the service vendor has access to the premium functions of the application. Similarly, features may be quickly disabled on demand.

The Smart Services core functionality 54 finally includes service control functions 552. These functions 552 permit the Smart Service 51 to be configured by support services or source programs using the service discovery functions 551. One control function 552 shutdowns or reboots the service. Another control function 552 flushes the session cache or local cache, as described above. Yet another control function 552 may issue control or configuration instructions to any of the other core functionalities 54 within the Smart Service 51. Another control function 552 implements service governance, which includes security features such as defining which customers can access which applications and services, and cataloging application and service assets in a registry. Control functions 552 may be implemented using a built-in web administration user interface, with the HTML for the interface programmed into the core functionality 54. Permissions to view this interface, or to use it for updating any core functionality of a Smart Service 51, may be controlled in a hierarchical fashion or using user- and group permissions in a fine-grained manner. Typically, only the service provider and the service vendor will have access to this interface.

Figure 6:
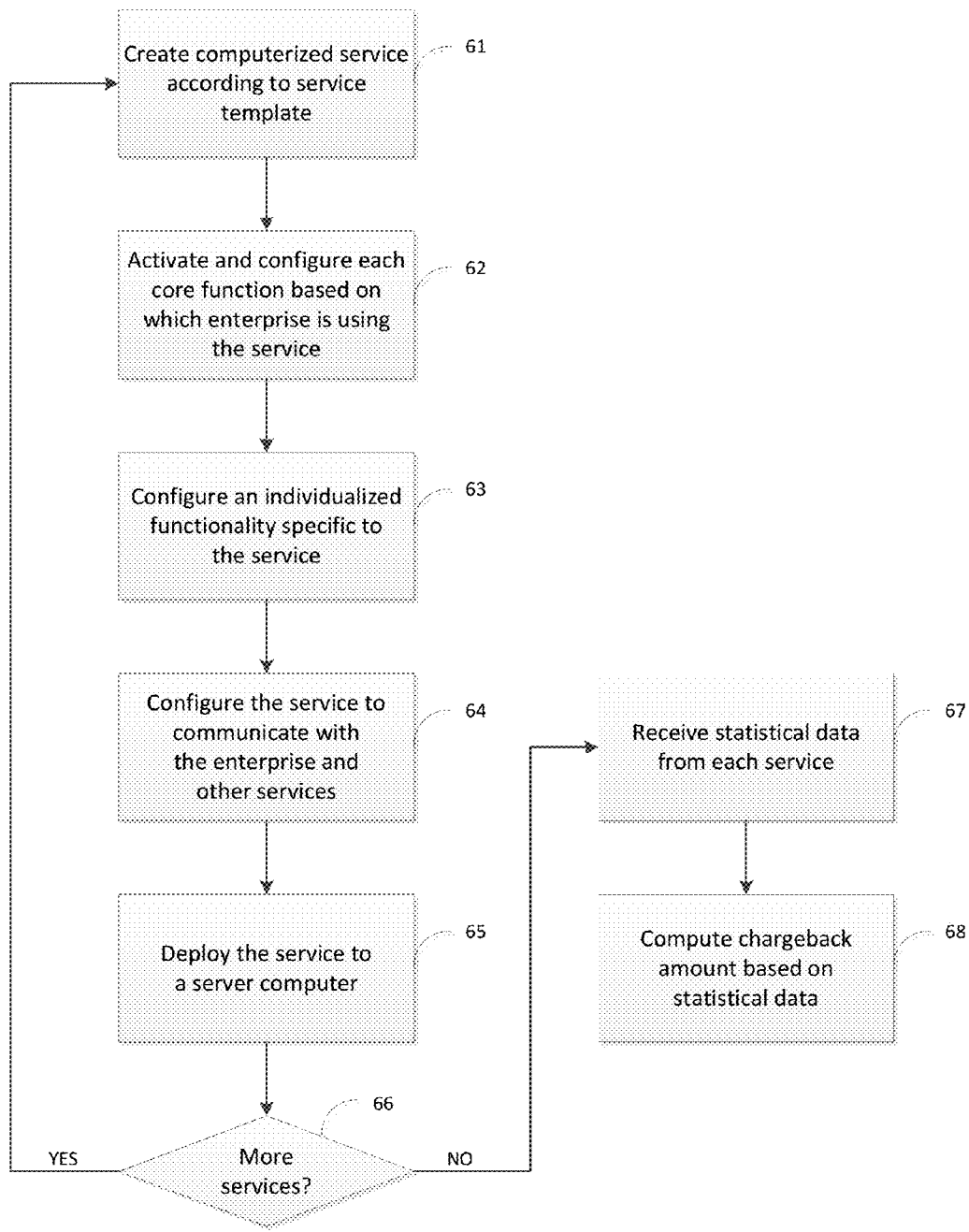
FIG. 6 is a flowchart showing a method of providing a plurality of computerized services to a plurality of enterprises.

FIG. 6 is a flowchart showing a method of providing a plurality of computerized services to a plurality of enterprises. The flowchart follows the processes described above to create and deploy a Smart Service 51. It should be appreciated that, while the processes are described in a particular order with reference to FIG. 6, embodiments of the invention need not undertake these processes in the order presented. Also, to the extent that certain processes are indicated as occurring in certain locations, embodiments of the invention need not always perform those processes there.

In process 61, a service provider creates a new Smart Service according to a service template. In some embodiments, the Smart Service is created in the development system 26 using an IDE or similar tool. Thus, creating the Smart Service can be as simple as pressing a button on a graphical user interface.

Different enterprises may require the same service functionality in different web applications. For example, a service provider may develop a "shopping cart" web application that it wishes to sell to a number of vendors. However, the provider may wish to sell different versions or tiers of the shopping cart with certain functionality disabled, at a lower cost to the vendor. Alternatively, the provider may work with vendors to tailor the shopping cart to enable exactly the functionality the vendor desires, and no more. This flexibility permits the vendor to obtain exactly the functionality they desire for the price they can afford, thereby opening up a larger potential customer base for the service provider.

In process 62, the service provider deactivates, or activates and configures, each core function based on which enterprise is using the Smart Service. This configuration can be done as a function of any contract and/or service level agreement between the service provider and the vendor. Typically this configuration step 62 is also done in the development system 26, although in some embodiments where individualized customization is not offered by the provider, a separate web application may permit a vendor to select from a small number of default configurations and automatically perform the configuration.

In process 63, the service provider configures the individualized functionality of the Smart Service. Ideally, the provider maintains a library of Smart Services that already contain the desired functionality. In this case, the provider may simply select a pre-made Smart Service, so process 63 may be combined with process 61. Otherwise, the provider must undertake to write new software. Even so, if the library of Smart Services is reasonably comprehensive, the provider may only have to write new front-facing services that provide web pages according to a particular vendor's specifications. Thus, as the service provider matures as an enterprise and develops more "back-office" Smart Services, it will engage in process 63 less and less often.

In process 64, the service provider configures the new Smart Service to communicate with the vendor's systems, and with other Smart Services. In particular, this process resolves communications formatting dependencies, so that the input channels 52 and output channels 56 can be configured. Each vendor may have legacy systems that the Smart Service must communicate with. For example, a vendor may require that front-facing services produce HTML that is viewable in older versions of popular web browsers. This requirement forces the front-facing service to produce HTML using certain markup tags that are less efficient than more modern constructs.

Also in process 64, the Smart Service is configured to communicate with other Smart Services. As explained in connection with FIG. 4, Smart Services in the ecosystem 42 need not use the relatively inefficient HTML or XML to communicate with each other, and can instead use binary formats. This process 64 determines which Smart Services this service depends on, and configures its input channels 52 and output channels 56 to translate from and to the data formats that those other Smart Services expect.

In process 65, the service provider deploys the configured Smart Service to a server computer. If the service is being tested, then it is deployed to a quality assurance server, while if the service has been tested and is approved for the production environment, it is deployed to a "live" production server. The techniques for deployment are known in the art. For example, the service executable code and various configuration files produced by processes 62-64 may be stored in an archive file, and uploaded to a web application server.

In process 66, a decision is made whether more services must be created. For any non-trivial web application, a multitude of services must be created, and the method loops back to process 61 to create the next service. Once all Smart Services have been created, configured, and deployed, the method moves to process 67.

In process 67, the service provider receives communications from each of the deployed Smart Services. These communications include a vast wealth of statistical data about the operation of each Smart Service. Typically, a service provider will set aside a separate monitoring system 27 to receive these communications, given their large numbers. It should be understood that, while not shown in FIG. 6, the monitoring system 27 does not merely passively receive these data, but also actively communicates with the Smart Services. In particular, the monitoring system 27 performs service availability checks, such as heartbeats or pings, to ensure that each service is still operating according to design parameters.

Then in process 68, the service provider computes, for each service, an amount to charge the vendor for its use of the service on the basis of the statistical data. Alternately, the service provider may analyze the statistical data to arrive at the chargeback amount, for example by performing a secondary statistical analysis of these data. Persons having ordinary skill in the art should appreciate that various embodiments of the invention may arrive at the chargeback amount using a variety of techniques.

Processes 61-65 typically are performed by a software developer using the development system 26. Likewise, processes 67 and 68 typically occur automatically in the monitoring system 27. However in some embodiments of the invention, these processes are performed by other individuals or on other computer systems.

It should also be appreciated that the processes 61-65 may be performed in a graphical user interface using a "wizard" tool. As is known in the art, a wizard tool permits an individual to answer questions about a piece of software that enables a computer to perform complex configuration and installation tasks. A service provider may leverage such tools to allow developers to create new services without having extensive programming expertise.

The development of Smart Services and the Smart Services ecosystem has a number of advantages. The reusability of Smart Services permits a service provider to provide vendors with a lower time-to-market. Smart Services address a vendor's concerns, including cost reduction and total cost of ownership for technology and MIS systems. Smart Services simplify the process of multi-channel integration and partner integration for vendors. Smart Services also provide vendors with a cloud-based integration strategy. Smart Services core functionality can leverage industry best practices, and provide a standardized framework in which to operate. Smart Services provide a "plug & play" functionality that permits flexible software reuse. All of these advantages result in reduced programming errors, faster software build times, cleaner and more efficient regression testing, faster product reviews, cohesive and simplified production support, and rapid deployment. Moreover, unified reporting using charts and dashboards to provide accurate chargebacks, near real-time performance indications, and quality of service monitoring provide additional advantages.

Figure 7:
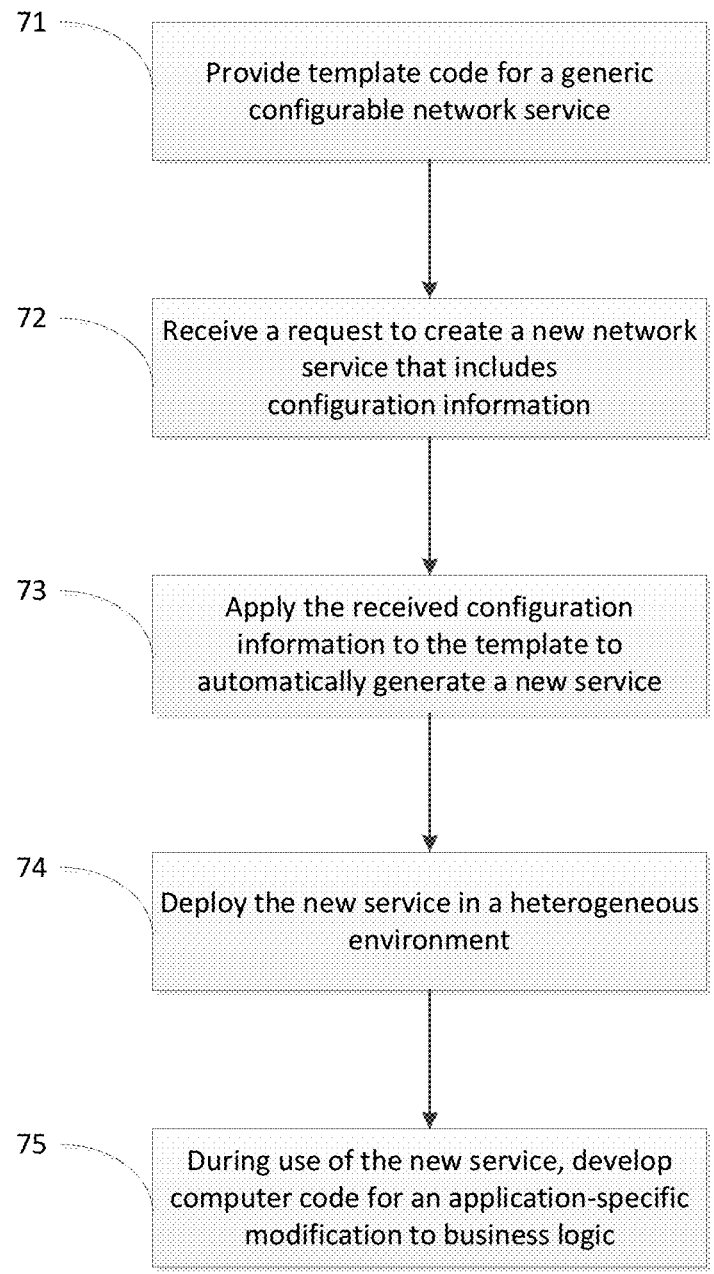
FIG. 7 is a flowchart showing a method of improving efficiency of developing computer program code in accordance with an embodiment of the invention.

FIG. 7 is a flowchart showing a method of improving efficiency of developing computer program code in accordance with an embodiment of the invention. In process 71, a code generation computer is provided with template computer code for a generic network service, referred to above as a Smart Service. Each such service includes template computer program code definition a configurable input data channel and a configurable output data channel. Moreover, each service includes multiple pre-defined service components, as described above. These service components each receive input data from the input data channel, operate on the input data to produce output data, and provide the output data to another service component or to the output data channel. As mentioned above, each such Smart Service may include, when it is generated, pre-defined default output data provided by a stub service that is configurable to transform input messages in a pre-defined manner.

In process 72, the code generation computer receives a request to create a new network service that includes information that allows the computer to configure the input and output data channels and at least one of the service components. It should be appreciated that not all service components may be required for every new service; for example, if service virtualization is used, it may not be necessary to provide a stub service. The request may be generated using a designer-friendly "wizard" or graphical application that probes the heterogeneous computing environment to determine available services and communications channels. Thus, for example, if the network included Service A and Service B that require enterprise integration, the configuration data could include an indication that the new service should receive data from Service A on a new channel, and send data to Service B on a new channel.

In process 73, the code generation computer applies the request to the template to automatically generate a new Smart Service. This may be done using conventional template techniques known in the art, for example using the JAVA® programming language. During process 73, the code generation computer configures the input and output data channels based on the request, and selects which service components should operate within the new Smart Service. The wizard then configures the integration tool, or ESB, with these new settings, updates configuration files, and flushes the caches of the affected services. Critically, the automatically generated new service can be configured to emulate a fully functioning service using the wizard.

In process 74, the new service is deployed in the heterogeneous computing environment, where it is used by other services. The ability to configure new network services using the wizard advantageously provides the ability to rapidly deploy standardized services having a large number of complex, but standardized components that communicate with each other according to pre-defined protocols. Thus, the new Smart Service may be immediately used to assist in the development of other services, even if the new Smart Service is not completely functional.

Ensuring final functionality occurs in process 75, in which custom computer code for the new service is developed while the new service is being used by other services and applications in the heterogeneous computing environment. By performing this method, new services with a minimum level of functionality can be quickly deployed, and used by other services while the remainder of their functionality is added. In this way, Smart Services increase the efficiency of the software development process, because they permit a minimally functional but complex applications to be developed quickly, and modular upgrades to individual components to be made in the production environment without disrupting the operation of the application.

The embodiments of the invention described above are intended to be merely exemplary; numerous variations and modifications will be apparent to those skilled in the art. All such variations and modifications are intended to be within the scope of the present invention as defined in any appended claims.

It should be noted that logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, a high-level language such as Fortran, C, C++, JAVA, SQL, Embedded SQL, XSL, HTML, or PHP) for use with various operating systems or operating environments (e.g. the Microsoft .NET framework). The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM, a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). In particular, computer program can be stored and maintained in a document versioning and revision control system (e.g., Apache™ Subversion( ) for versioning in development environment.

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

MICROSOFT is a registered trademark of Microsoft Corporation of Redmond Wash. JAVA is a registered trademark of Oracle Corporation of Redwood City, Calif., and/or its affiliates. IBM is a registered trademark of the International Business Machines Corporation of Armonk, N.Y.

What is claimed is:

1. A method of providing a plurality of computerized services to a plurality of enterprises, the method comprising:
   (1) in a development system, creating a computerized service that includes from a service template a pre-defined plurality of service-oriented architecture (SOA) functions;
   (2) using the development system to configure, in a manner specific to a given enterprise in the plurality of enterprises, the computerized service either to use or to not use each of the plurality of SOA functions;
   (3) using the development system to configure a functionality that is specific to the given service;
   (4) using the development system to configure the given service to communicate with either or both of (a) the given enterprise, and (b) at least one other computerized service in the plurality of computerized services;
   (5) deploying the given service to a server computer for access by the given enterprise in the plurality of enterprises, the given service being deployed to have at least minimum level of functionality that is usable by other services while one or more further functionalities are created and added to the given service;
   (6) performing steps (1)-(5) a plurality of times;
   (7) in a monitoring system, coupled to the data store and the server computer, receiving communications from each of the plurality of deployed computerized services; and
   (8) using the monitoring system to compute, for each given service, as a function of statistics data in the received communications from the given service, an amount to charge the given enterprise for use of the given service,
   wherein the plurality of SOA functions includes a plurality of the group comprising: message processing, service auditing, logging, exception management, service virtualization, mocking, stubbing, performance monitoring, service availability, service packaging, service configuration, event handling, data reporting, service discovery, service control, and service security.

2. The method of claim 1, further comprising:
   receiving a service request in a deployed service from a client application over a data communications network;
   retrieving data from the service request or from a data store over a private network, in response to receiving the service request;
   performing a computation on the retrieved data; and
   transmitting the results of the computation to the client application over the data communications network.

3. The method of claim 2, wherein performing the computation on the retrieved data comprises:
   transmitting a service request that includes a portion of the retrieved data to a second deployed service over the private network; and
   receiving a response from the second deployed service.

4. The method of claim 2, wherein the results of the computation comprise either a web page encoded using HTML, or a data structure encoded using either XML or JSON.

5. The method of claim 1, wherein activating and configuring each of the SOA functions comprises using a wizard tool displayed on a graphical user interface.

6. The method of claim 1, wherein the statistics data comprise one or more of: a number of times the given service has been accessed, a duration over which the given service was accessed, an amount of bandwidth consumed by the given service, an amount of computational time consumed by the given service, an average time taken to provide the given service, a number of exceptions raised by the given service, and an amount of data storage consumed by the given service.

7. A system for providing computerized services to a plurality of enterprises, the system being coupled to the plurality of enterprises using a first data communication network, the system comprising:
   a data store storing data;
   a server computer, coupled to the data store using a second data communication network, that executes a plurality of computerized services as a function of the stored data;
   a development system comprising one or more physical hardware processors, coupled to the data store and the server computer using the second data communication network, that is configured to create, and deploy to the server computer, each service in the plurality of computerized services wherein creating a given service comprises:
      including, in the given service from a service template, a pre-defined plurality of service-oriented architecture (SOA) functions;
      configuring, in a manner specific to a given enterprise in the plurality of enterprises, the given service either to use or to not use each of the plurality of SOA functions,
      creating the given service with at least a minimum level of functionality that is deployable to and usable by other services while one or more further functionalities are created and added to the given service, configuring the functionality specific to the given service, and configuring the given service to communicate with either or both of (a) the given enterprise, using the first data communication network, and (b) at least one other computerized service in the plurality of computerized services; and a monitoring system comprising one or more physical hardware processors, coupled to the data store and the server computer using the second data communication network, that is configured to (a) receive communications from each of the plurality of computerized services, after it has been deployed on the server computer, and (b) compute, for each given service, as a function of statistics data in the received communications from the given service, an amount to charge the given enterprise for use of the given service, wherein the plurality of SOA functions includes a plurality of the group comprising: message processing, service auditing, logging, exception management, service virtualization, mocking, stubbing, performance monitoring, service availability, service packaging, service configuration, event handling, data reporting, service discovery, service control, and service security.

8. The system of claim 7, wherein the first data communication network includes the Internet.

9. The system of claim 7, wherein the second data communication network includes a local area network or a virtual private network.

10. The system of claim 7, wherein the development system further comprises a display upon which is displayed a graphical user interface having a wizard tool for configuring the plurality of SOA functions.

11. The system of claim 7, wherein the statistics data comprise one or more of: a number of times the given service has been accessed, a duration over which the given service was accessed, an amount of bandwidth consumed by the given service, an amount of computational time consumed by the given service, an average time taken to provide the given service, a number of exceptions raised by the given service, and an amount of data storage consumed by the given service.

12. A non-transitory, tangible computer readable storage medium having computer code thereon for creating and deploying a computerized service to an enterprise, the medium comprising computer code for:

creating and deploying to a server computer each service in a plurality of computerized services wherein the computer code for creating a given service comprises computer code for:

including, in the given service from a service template, a pre-defined plurality of service-oriented architecture (SOA) functions, configuring, in a manner specific to a given enterprise in a plurality of enterprises, the given service either to use or to not use each of the plurality of SOA functions, creating the given service with at least a minimum level of functionality that is deployable to and usable by other services while one or more further functionalities are created and added to the given service, configuring the functionality specific to the given service, and configuring the given service to communicate with either or both of (a) the given enterprise, and (b) at least one other computerized service in the plurality of computerized services; and monitoring by (a) receiving communications from each of the plurality of computerized services, after it has been deployed on the server computer, and (b) computing, for each given service, as a function of statistics data in the received communications from the given service, an amount to charge the given enterprise for use of the given service, wherein the plurality of SOA functions includes a plurality of the group comprising: message processing, service auditing, logging, exception management, service virtualization, mocking, stubbing, performance monitoring, service availability, service packaging, service configuration, event handling, data reporting, service discovery, service control, and service security.

* * * * *